(12) United States Patent
Gosieski, Jr.

(10) Patent No.: US 7,231,233 B2
(45) Date of Patent: Jun. 12, 2007

(54) COMBINED MULTI-MEDIA AND IN EAR MONITORING SYSTEM AND METHOD OF REMOTE MONITORING AND CONTROL THEREOF

(75) Inventor: George J. Gosieski, Jr., Midlothian, VA (US)

(73) Assignee: G Squared, LLC, Midlothian, VA (US)

( * ) Notice: Subject to any disclaimer, the term of this patent is extended or adjusted under 35 U.S.C. 154(b) by 100 days.

(21) Appl. No.: 10/974,053

(22) Filed: Oct. 27, 2004

(65) Prior Publication Data

US 2005/0113136 A1 May 26, 2005

Related U.S. Application Data

(60) Provisional application No. 60/524,779, filed on Nov. 25, 2003.

(51) Int. Cl.
*H04M 1/00* (2006.01)

(52) U.S. Cl. ............... 455/569.1; 455/557; 455/556.1; 340/505; 340/539

(58) Field of Classification Search ............ 455/569.1, 455/565, 557, 556.1; 340/505, 539; 370/260
See application file for complete search history.

(56) References Cited

U.S. PATENT DOCUMENTS

| | | | |
|---|---|---|---|
| 6,144,848 A | | 11/2000 | Walsh et al. |
| 6,317,039 B1 * | | 11/2001 | Thomason ............... 340/505 |
| 2002/0032048 A1 | | 3/2002 | Kitao et al. |
| 2002/0186668 A1 * | | 12/2002 | Thomason ............... 370/260 |
| 2003/0063756 A1 | | 4/2003 | Geerlings et al. |
| 2003/0104806 A1 * | | 6/2003 | Ruef et al. ............... 455/422 |
| 2003/0217363 A1 * | | 11/2003 | Brady et al. ............. 725/76 |
| 2004/0058674 A1 | | 3/2004 | Yoakurn |
| 2004/0157555 A1 * | | 8/2004 | Richenstein et al. ...... 455/39 |
| 2005/0027888 A1 | | 2/2005 | Juszkiewicz |
| 2005/0245838 A1 | | 11/2005 | Kuramori et al. |
| 2005/0281421 A1 | | 12/2005 | Armstrong |
| 2005/0281422 A1 | | 12/2005 | Armstrong et al. |
| 2005/0281423 A1 | | 12/2005 | Armstrong et al. |

* cited by examiner

*Primary Examiner*—Danh Le
(74) *Attorney, Agent, or Firm*—Williams Mullen, P.C.; Thomas F. Bergert (57) ABSTRACT

A combined microphone and in-ear monitoring (IEM) system enhances sound and/or visual data transmission, production, recording, reinforcement and monitoring in real-time.

28 Claims, 4 Drawing Sheets

COMBINED MULTI-MEDIA AND IN EAR MONITORING SYSTEM AND METHOD OF REMOTE MONITORING AND CONTROL THEREOF

CROSS-REFERENCE TO RELATED APPLICATIONS

This application claims priority under 35 USC 119(c) of U.S. patent application Ser. No. 60/524,779, entitled "Wireless Sound System for Transmission, Production, Recording and Monitoring in Real-Time", filed Nov. 25, 2003 and incorporated herein by reference.

TECHNICAL FIELD

The present invention relates to wireless communication systems, and more particularly, to a bi-directional, full duplex, digital communication system which can incorporate a wireless microphone system and an in-ear monitoring system for enhanced sound transmission, production, recording, sound reinforcement and monitoring in real-time.

BACKGROUND ART

Professional multi-media systems and multi-media control can be applied in environments as diverse as concert halls, stadiums, clubs, convention centers, conferencing centers, open air spaces, houses of worship, meeting spaces (government-, corporate-, and private-sector), recording studios, film, television, radio, ENG (electronic news gathering), and two-way communications, for example. Professional multi-media systems focus on the capture, monitoring, storage, and/or reinforcement of one or more audio or visual signals generated by one or more sources, which can be animate or inanimate. This process can occur in real-time requiring low latencies (below human recognition). Audio signals are captured via microphones, for example, which convert the sound waves comprising the audio signal into electrical impulses. These impulses are typically transmitted to a multi-channel control surface via cables. Each microphone is assigned a unique channel within the control surface. Visual signals are captured by video cameras, digital cameras, analog cameras, projection systems (e.g., LCD projectors), scanners and the like, and are similarly transmitted. The control surface allows an audio/visual engineer to modify the incoming multi-media signals and blend these incoming channels into fewer output channels should this be desired. This output can be sent to a storage device (in the case of recording), speakers (in the case of venue with a sound reinforcement system), visual interface or a combination thereof, for example. The engineer can also use the control surface to create a monitor mix from the incoming audio signals independent of the primary mix. This monitor mix is customized to meet each performer's personal preference, then transmitted back to each respective performer so each can manage his or her own performance.

Historically, routing of multi-media signals has been accomplished through a wired environment using cables and patch panels to connect the various pieces of equipment (microphones, cameras, control surfaces, processing equipment, storage devices, displays and speakers, for example). This requires significant resources to install and manage, including large amounts of supporting equipment and facility infrastructure capable of routing cables and housing and cooling all of this equipment, as well as significant power requirements and conditioning. Over the past several years, the traditional wired environment has been challenged by wireless technology, allowing more flexibility in arranging and locating equipment and reducing wire management cost over the traditional wired environment.

Two examples of wireless audio solutions are wireless microphone systems and wireless IEM (in ear monitoring) systems. The typical wireless microphone system consists of a transmitter (which can be handheld or a body pack, for example) and a receiver with a one-to-one correspondence, i.e., one transmitter to one receiver. The typical wireless IEM system consists of a receiver (e.g., body pack) and one transmitter. This system, like the wireless microphone system, has a one-to-one correspondence between the transmitter and the receiver.

Wireless Microphone Systems

Today's wireless microphone systems are limited to uni-directional transmission, broadcast over the very-high frequency (VHF) or ultra-high frequency (UHF) band, using FDM (Frequency Division Multiplexing). With the exception of a few products, today's systems are analog, not encrypted, and have a wired analog interface with control surfaces such as consoles. Their range is typically 300 feet and, in some cases, extends upwards of 1,500 feet (line-of-sight).

Management of the transmitter's parameters is discrete. Controls for managing body pack and handheld transmitter parameters are located on the unit. The receiver can monitor some or all of the transmitter's parameters but can not change them. The receiver typically has a small display (LCD and/or LED) that displays receiver parameters and some or all of the transmitter's parameters. Since the receiver only monitors transmitter parameters, the engineer informed of the parameters must then physically interact with the transmitter to adjust the transmitter settings or inform an assistant or stagehand to adjust the transmitter.

A recent trend in wireless microphone management is the introduction of Ethernet LAN (Local Area Network) technology to link one or more receivers (e.g., base stations), via a router or switch, to a laptop computer that provides a GUI (graphical user interface) for monitoring and adjusting receiver parameters and monitoring transmitter parameters. This allows remote monitoring of the transmitters and remote monitoring and adjustment of the interconnected receivers. The LAN does not provide bi-directional communication between the transmitter and its receiver. Because bi-directional communication is lacking between the transmitter and the receiver, controls related to the body pack and handheld transmitters reside within each unit. Such distributed control and unidirectional communication hinders the ability to effectively manage the system remotely. Hence the system still requires the engineer, assistant or stagehand to physically interact with the transmitter in order to modify the transmitter's parameters.

External ¼ wavelength antennas are typically used for body pack transmitters while internal or external antennas are found on handheld transmitters. Receivers have a broader selection of antennas ranging from passive omni-directional to powered directional antennas. In most products, these antennas support some form of diversity architecture ranging from the use of two antennas feeding a signal radio to two antennas feeding two independent radios. Additionally, transmitter power consumption has continued to trend downward, extending the operating life of these devices. Transmitter operating time currently ranges from 8-14 hours using primary batteries (typically alkaline). Operating time is somewhat less with secondary (rechargeable batteries).

While wireless microphone systems having the above basic capabilities are known and currently available, analog to digital signal conversion for wireless microphone systems has only recently become available in a very limited number of products. For example, Lectrosonics, Inc. of Rio Rancho, N. Mex. offers a digital system designed for ENG and the film industry. This product offers 128-bit encryption. The transmitter converts the analog microphone signal to a digital signal. The analog signal is sampled 44.1 k times per second with a resolution of 24-bits. It is compressed to 20-bits and encrypted before being transmitted to the receiver. The receiver performs digital to analog signal and AES (Audio Engineering Society) conversion. The digitized signal is broadcast over an FM carrier in the UHF band.

Zaxcom, Inc. of Pompton Plains, N.J. offers a digital wireless microphone system aimed at ENG and the film industry that uses the transmitter to convert the analog microphone signal to a digital signal before transmitting it to the receiver where it is converted back to an analog signal. This product uses a proprietary modulation over the UHF band. The analog signal is sampled at 96 k bits per second with a resolution of 24 bits. Operating time per charge is 4-6 hours.

A wireless microphone system from Beyerdynamic GmbH of Heilbronn, Germany is designed for meetings and conferences and provides bi-directional transmission. It operates in the 2.4 GHz band and uses DSSS (Direct Sequence Spread Spectrum) modulation and is, most likely, based on the 802.11b wireless LAN standard. The control box (i.e., base station) can support up to eight (8) wireless cards and multiple wireless microphones. System bulkiness and specifications limit its use to conference environments—e.g., it requires a proprietary microphone, twelve (12) AA batteries per transceiver, and has a frequency response of 70-10 kHz.

Wireless In-Ear-Monitoring (IEM) Systems

Today's wireless IEM systems are limited to unidirectional transmission. They broadcast an analog signal over the very-high frequency (VHF) or ultra-high frequency (UHF) band using FDM (Frequency Division Multiplexing). They are typically not encrypted. Their range is typically 300 feet (line-of-sight). The typical system consists of a receiver (body pack), transmitter, and an ear apparatus, such as ear pieces or earbuds. Receiver and transmitter have a one-to-one correspondence—i.e., one receiver to one transmitter. Typical frequency response is 40-15 kHz.

Management of the various functions is discrete with controls for managing the wireless receiver (body pack) functions located on the receiver. The transmitter monitors overall system functions and is unable to initiate a change in the receiver's parameters. Receiver battery life is typically 4 to 6 hours with some exceptions exceeding 14 hours. Unlike wireless microphone systems, current IEM systems do not incorporate Ethernet technology into the transmitter resulting in the inability to remotely monitor the IEM system. IEM systems use a wired analog audio interface with control surfaces such as consoles. Further, current IEM systems do not integrate a wireless microphone system of any type, provide analog to digital or digital to analog conversion, signal encryption, bi-directional transmission, remote monitoring, or remote management.

In one aspect, the present invention provides bi-directional, full duplex communication through digital wireless technology, thus enabling remote system management, and conversion of transmitters into transceivers (i.e., clients) and receivers into base stations (i.e., access points). The present invention employs digital technology to provide an encrypted audio and/or visual signal, user selected audio quality ranging from CD to DVD-A/SACD quality and user selected video quality such as HDTV or SDTV, for example. The present invention also permits user selectable formats (PCM (pulse-code modulation) or DSD (direct stream digital)). The present invention further provides a remote management solution to monitor and adjust transceivers, base station and other system components remotely from a computer with the system's management software or a control surface. The present invention integrates the wireless audio, visual and IEM systems into a single communication system, and extends system range up to 1,000 meters (line-of-sight). The present invention also creates a one-to-many correspondence between base station and transceivers (receiver and transmitter, respectively based on current industry technology) i.e., one base station to many transceivers. This is beyond the current systems, which are unidirectional, analog, stand-alone, limited in range, one transmitter to one receiver, and have limited audio and visual quality.

SUMMARY OF THE PRESENT INVENTION

The present invention creates a paradigm shift by creating a digital, bi-directional communication system that combines a wireless multi-media system and wireless IEM system into one system. In one embodiment, the present invention comprises an access point, one or more clients, a network, an ear apparatus and system management software. The clients, e.g., transceivers, can be embodied as a body pack or handheld device, for example. In an illustrative embodiment, the ear apparatus can be integrated into a headset capable of holding a microphone. The present invention also provides a method for bi-directional communication between the remote components and the access point enabling remote system management. In one embodiment, the present invention can support over two hundred clients per access point.

Some of the advantages of the present invention are that it provides a Quality of Service (QoS) optimized for low latency, real time audio transmission, supports 802.11 protocols and standards—e.g., 802.11a, 802.11g, 802.11d, 802.11e, 802.11f, 802.11h, 802.11j, and 802.11n, supports 802.16 protocols and standards, transmits over unlicensed bands—ISM (Industrial, Scientific and Medical) band and U-NII (Unlicensed National Information Infrastructure) band, with the ability to operate in multi-band, multi-mode transmission mode, and can further transmit over the VHF or UHF bands.

In one embodiment, the present invention uses a coded modulation such as XGCM in conjunction with OFDM (Orthogonal Frequency Division Multiplexing), MIMO (Many In Many Out), BPSK (Binary Phase Shift Keying), QPSK (Quadrature Phase Shift Keying), CCK (Complementary Code Keying), and QAM (Quadrature Amplitude Modulation). In another embodiment, the invention uses VOFDM (Vector Orthogonal Frequency Division Multiplexing). In yet another embodiment, the inventions uses WOFDM (Wideband Orthogonal Frequency Division Multiplexing). In one embodiment, the present invention uses spread spectrum technology, such as FHSS (Frequency Hopping Spread Spectrum), or DSSS (Direct Sequence Spread Spectrum), for example.

In one embodiment, the present invention uses phased array antennas to reduce power consumption, increase range, and track transceiver location while improving immunity to interference. Also, the present invention can further provide signal encryption for secure transmissions in compliance with AES standards. In an illustrative embodiment, the present invention supports AES/EBU standards for transmitting digital audio. In another embodiment, the invention also supports AES-47. In one embodiment, the present invention can provide for transmitted sampling rates of 48 kHz, 96 kHz, and 192 kHz with a 24-bit resolution. Higher sampling rates can also be accommodated. Sample rates and sample formats can be selected automatically using the system management programming of the present invention, or manually such as by an engineer, for example.

The present invention optionally provides a transmitted sampling rate in a pulse code modulation (PCM) format complying with DVD-A. In one embodiment, the invention provides sample rates and formats compliant with SACD and DVD-A. The present invention can operate as a stand-alone system or can interface with and be controlled by a computer or control surface such as a digital console or digital audio workstation (DAW). A computer for purposes of the present invention can be defined as any device using a processor, micro-processor, embedded processor, micro-controller, and/or DSP, memory device, storage device, and user interface such as a display, for example.

In addition to the above advantages, the present invention provides a level of flexibility, scalability, and upgradeability unavailable in today's multi-media industry using modular plug & play sub-systems, on-line firmware and software upgrades. The present invention further provides an open source software platform to allow third party development of plug-ins. The present invention also tracks, sequences, and records an engineer's settings and preferences, allowing this information to be stored as a group and recalled at a later date. Groups can be sequenced and stored for future use as super sets, i.e., scenes. In one embodiment, this capability encompasses lighting systems and audio/visual equipment.

Further, the present invention can create an acoustic model for a venue and store it in a database for future reference. In one embodiment, the present invention analyzes and recommends parameter settings for a particular venue based on a system generated acoustic and/or visual model of the venue, a stored record of the engineer's typical settings and preferences, and the engineer's settings and preferences for that venue and venues with similar acoustic and/or visual models. The present invention can automatically scan a venue to evaluate the local RF environment, ranking potential sources of interference, recommending interference free, intermodulation free settings, configuring the RF components to maximize reception and immunity, and providing dynamic channel selection and dynamic RF power regulation.

The present invention is capable of using fuel cell technology for extended operating life, rechargeable batteries, primary batteries, or rechargeable batteries with fuel cell back-up. The present invention further monitors signal strength and optimizes system parameters to maximize signal integrity and minimize bit error rate (BER). The present invention further complies with all applicable AES/EBU, IEC, and EIAJ standards including AES/EBU 42, 43, and 3; IEC-60958; and EIAJ CP1201. The present invention also complies with applicable USA, Japanese, and European regulatory agency regulations related to transmitting over unlicensed bands such as ISM and U-NII.

In addition, the present invention can track the position of active transceivers and use this information to automatically adjust control surface panning controls. This capability effectively eliminates the subjectivity of locating and tracking an audio source within the soundfield of a stereo or surround sound recording, broadcast, or sound reinforcement system, thereby improving realism, efficiency, and accuracy. The present invention further provides digital interfaces compliant with AES, Firewire 2, Ethernet, and ATM standards.

DETAILED DESCRIPTION OF THE PREFERRED EMBODIMENTS

In one embodiment, the present invention provides a digital wireless multi-media system and a digital wireless IEM system eliminating the redundancy resulting from separate and independent wireless microphone and IEM systems while improving signal quality, system reliability, system management, and increasing functionality.

Figure 1:
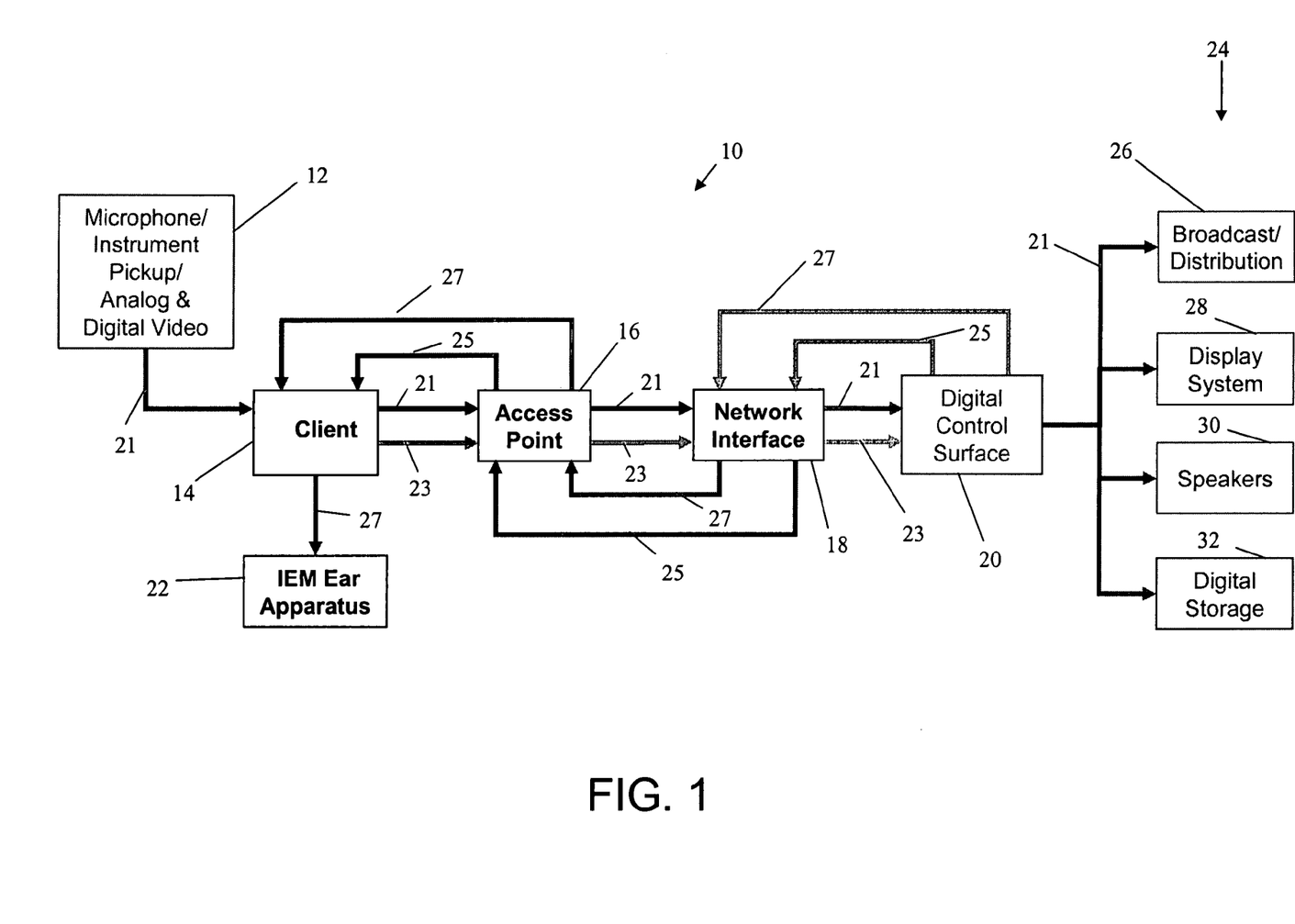
FIG. 1 shows a system signal diagram for one embodiment of the present invention.

As shown in FIG. 1, the present invention can comprise a system 10 including, in one embodiment, an input device 12, a client 14, an access point 16, a network interface 18, a control surface 20, an IEM ear apparatus 22 and output elements 24. Input device 12 can be, for example, a microphone, an instrument pickup, a still camera, a video camera, and other known devices for receiving audio and visual data. Client 14 can be one or more transceivers in the form of a body pack or handheld transceiver, for example. Access point 16 can be a base station, for example, and ear apparatus can comprise earbuds or ear pieces as are commonly known in the art. In one embodiment, control surface comprises management software for managing the system 10 as well as the input device(s) and client(s), wherein the management software operates through a computer. Control surface can also be an analog control surface or a digital control surface, and, in one embodiment, can comprise a digital audio workstation (DAW). For purposes of the present invention, a DAW can be considered as any computer, computer system, processor or micro-controller based product that can convert analog multi-media signals to digital multi-media signals, record, and/or manipulate digital audio and visual signals. In one embodiment, multiple clients are provided per access point, creating a one-to-many relationship.

As shown in FIG. 1, there are four signal paths that are managed at any given time—audio and/or visual input data (hereafter multi-media data) 21, system status data 23, system control data 25, and IEM data 27. Multi-media data 21 generally begins as an analog signal that is converted into a digital signal within the client, although digital visual data can also be initially transmitted to the client in digital form and, in one embodiment, digital audio data can be initially transmitted to the client such as via a digital microphone, for example. The digital signals are transmitted wirelessly by the client to the access point via the client's radio. In one embodiment, the access point routes the digital audio signal through an audio transmitter for conversion to an AES compliant signal before routing via network interface 18 to the control surface 20.

In another embodiment, the digital audio signals are routed through an audio transmitter located in the client for conversion to an AES compliant signal prior to being transmitted to the access point. It will be appreciated that the access point can, in one embodiment, comprise a sub-system within the control surface, integrated such as via a network interface card, for example. In this embodiment, the access point routes the digital audio signals through an audio transmitter for conversion to an AES compliant signal before routing to any other control surface.

The control surface disseminates the incoming signals to channels designated by the multi-media engineer. Control surface 20 receives the digital input data 21 and status data 23 and can proceed to broadcast and/or distribute the data as at 26, show the visual data on a display system 28, output the data through speakers 30 or similar output devices, and/or store the data using storage component 32. At this point the audio engineer has the ability to blend the incoming signals into individualized IEM signals for each performer. Control surface also allows the input and status data to be monitored, altered and otherwise controlled for feedback to the IEM apparatus 22 and the other components. As shown in FIG. 1, control surface is a digital control surface 20 which sends control data 25 and IEM audio data 27 back to client 14 via network interface 18 and access point 16. In one embodiment, control surface compresses the IEM data for more efficient delivery to client 14, whereupon the data is uncompressed prior to delivery to IEM apparatus 22. In this way, the user operating a microphone, instrument, camera or other audio or visual input device can be monitored, and various parameters associated with the sound or visual input can be adjusted remotely, as opposed to physical, in-person adjustment by an engineer or similar individual. It will be appreciated that the digital console and/or DAW allows the analog signal, which is digitized virtually at its source, to remain digitized through the entire signal chain. This early conversion ensures minimal degradation of the signal and higher immunity to interference during the acquisition and broadcasting processes. It will further be understood that compression and uncompression procedures and techniques can be accomplished via data compression technology as is known in the art, including techniques such as AAC, AAC+, MP3, and WMA.

In an illustrative embodiment, the IEM system comprises two earbuds or two earpieces having a wired connection to the client which processes the IEM signal as shown. The earbuds can operate independent of a microphone or in conjunction with a microphone. The latter configuration can be provided by the present invention, in one embodiment, through a headset with a wired connection to the client or as two separate clients (e.g., body pack for IEM and handheld for a microphone). It will be appreciated that the ear apparatus can further comprise an aural or a binaural ear apparatus. In binaural recording, two microphones are placed near or in a listener's ears (or alternately, an acoustically accurate dummy head's ears). The sounds that the two microphones record are exactly what the listener hears, including the effects of the outer ear (the pinna), the acoustic shadow of the head, and inter-ear phase and frequency response differences that provide localization cues (the information that lets the listener determine where a sound is coming from). When the binaural recording is played back over headphones, the ambient sound field of the recording location is reproduced more-or-less exactly.

Figure 2:
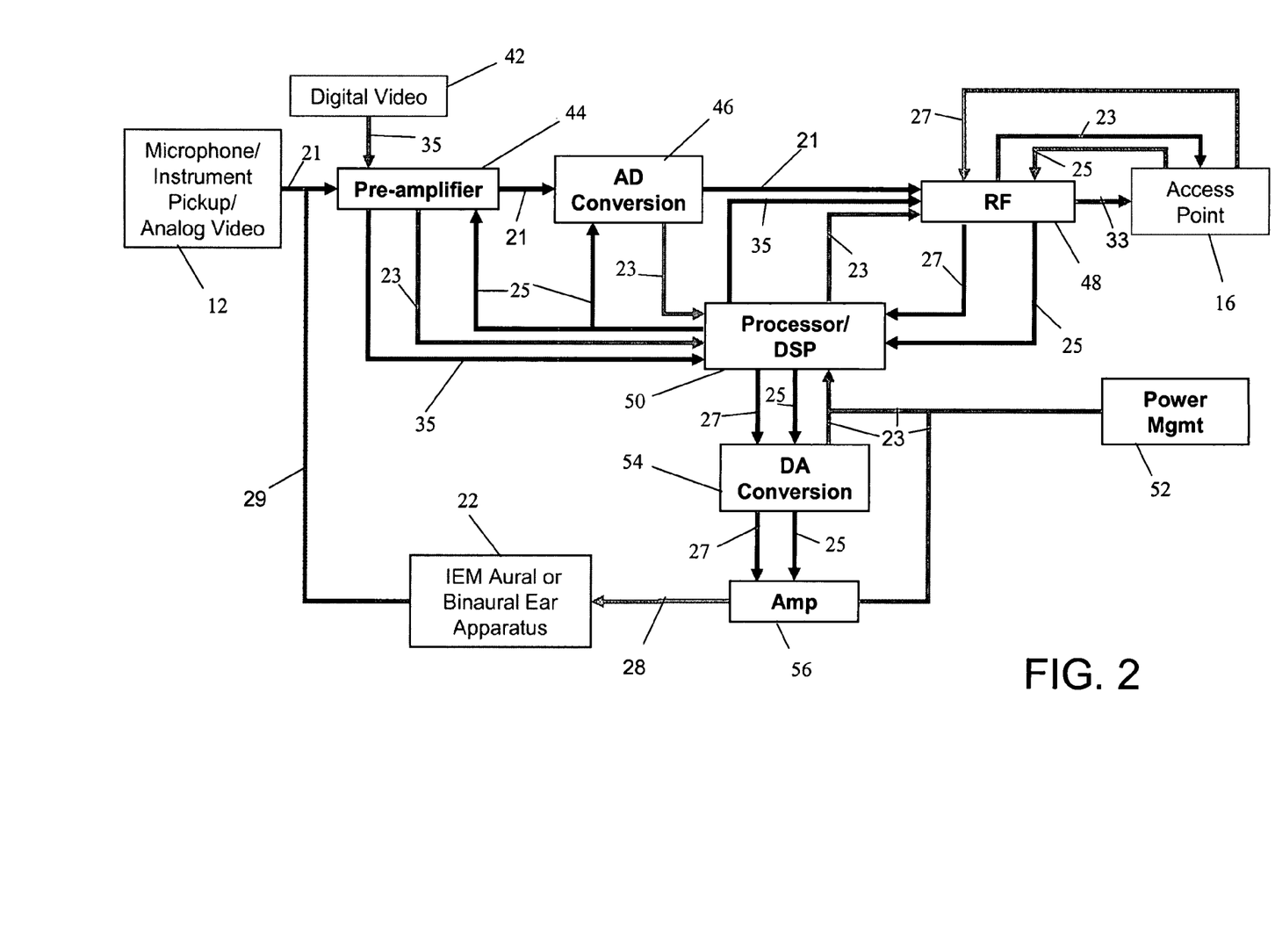
FIG. 2 shows a transceiver signal diagram in connection with the embodiment of the present invention whereby the IEM apparatus is wired.

FIG. 2 shows an example client and/or transceiver signal diagram for use in connection with the present invention when using a wired IEM apparatus. As shown in FIG. 2, input devices 12 and 42 provide multi-media input data 21 and 35, respectively, to a pre-amplifier component 44, which converts the analog signals to digital via an analog-digital converter 46, for example, before transmitting the now-digital signal 21 to RF (radio frequency) component 48. Any digital video signal 35 (or digital audio signal, such as through a digital microphone, for example) received by the pre-amplifier component 44 is transferred to processor 50 for direct transmission to RF component 48, which transmits the all-digital signal 33 (audio multi-media data plus digital video or other data) to access point 16 for processing as described above. Upon receiving return data, access point sends, and RF component 48 receives, control data 25 and IEM data 27 for further processing. Processor/DSP (digital signal processor) component 50 receives the control data 25 and IEM audio data 27 which proceeds to convert the digital signals 25, 27 for the IEM apparatus to analog via digital-analog converter 54, whereupon these signals are amplified via amplifier 56 and the audio signals 28 are transmitted to IEM apparatus 22. In the case of a binaural ear apparatus, the microphone signal 29 from the binaural ear apparatus is transmitted to pre-amplifier 44 as shown in FIG. 2. It will be appreciated that pre-amplifier 44, AD converter 46, DA converter 54, amplifier 56 and a power management component 52 will also have associated system data 23 transmitted to processor 50 for transmission to RF component 48 and subsequent transmission to access point 16 for monitoring and, in most cases, control. As shown in FIG. 2, return control signals 25 are processed through RF component and processor 50 and directed out to the pre-amplifier 44, AD converter 46, DA converter 54 and amplifier 56. In the embodiment of the invention whereby the IEM audio data from the access point 16 is compressed, processor 50 also acts to uncompress the IEM data before it is transmitted to IEM apparatus.

In one embodiment, the IEM subsystem communicates with the client via Bluetooth, UWB (ultra wideband), WUSB (wireless universal serial bus), or Zigbee. The access point can receive these signals via the client's radio which routes these signals to a control surface via its network interface. The network interface supports LAN protocols such as Ethernet, ATM, and Firewire 2, for example. The access point and control surface or, in the case of an analog control surface, digital-to-analog converter (DA converter) interface with each other via a wired connection (fiber optic or copper). In yet another embodiment, the IEM subsystem communicates directly with the access point wirelessly.

Figure 3:
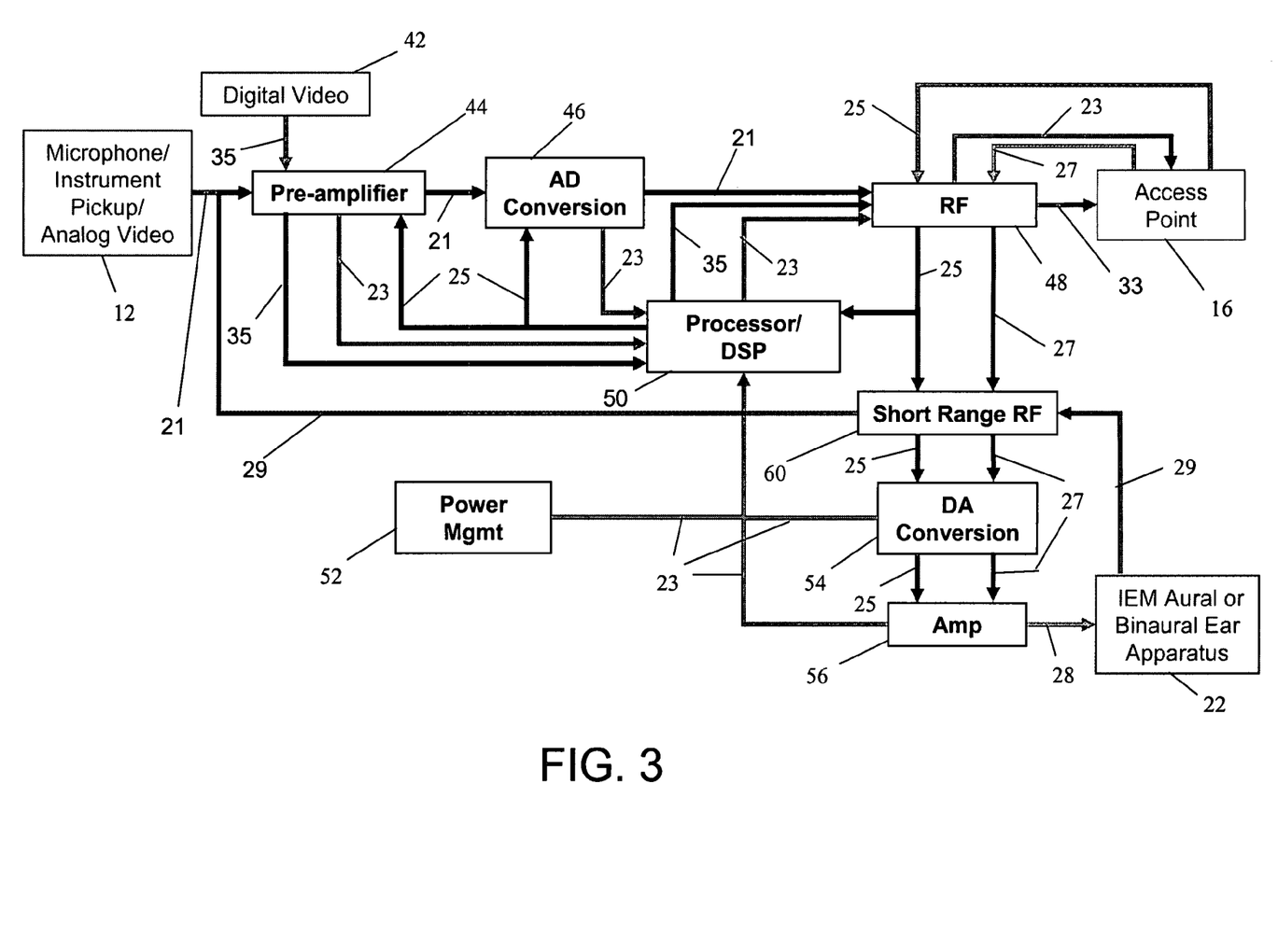
FIG. 3 shows a transceiver signal diagram in connection with another embodiment of the present invention whereby the IEM apparatus is wirelessly connected.

FIG. 3 shows an example client and/or transceiver signal diagram for use in connection with the present invention when using a wireless IEM apparatus. As shown in FIG. 3, input data 21, 35 and 33 and system data 23 are processed as described in connection with FIG. 2. However, control data 25 from RF component 48 is transmitted both to processor 50 and short range RF component 60. Control data 25 received by the short range RF component 60 is also transmitted to the DA converter 54 and amplifier 56, whereas control data 25 received by the processor 50 is transmitted to the pre-amplifier 44 and AD converter 46. Thus, each element of the client is capable of being controlled and/or receiving control data via access point 16, with the exception of power management component 52.

The IEM audio data 27 received by the RF component 48 from access point 16 is transmitted from RF component 48 directly to short range RF component 60. IEM audio data is processed as in connection with FIG. 2 and transmitted to IEM apparatus, whereby the microphone signal(s) 29 from a binaural ear apparatus, if employed, is transmitted to the short range RF component 60 and subsequently transmitted to pre-amplifier, as described in connection with FIG. 2. In the embodiment of the invention wherein the IEM data is compressed, instead of IEM data being transmitted directly from RF component 48 to short range RF component 60, the compressed IEM data is transmitted from RF component 48 to processor 50, where it is uncompressed and transmitted to short range RF component for further processing consistent with the above description in connection with FIG. 3.

Figure 4:
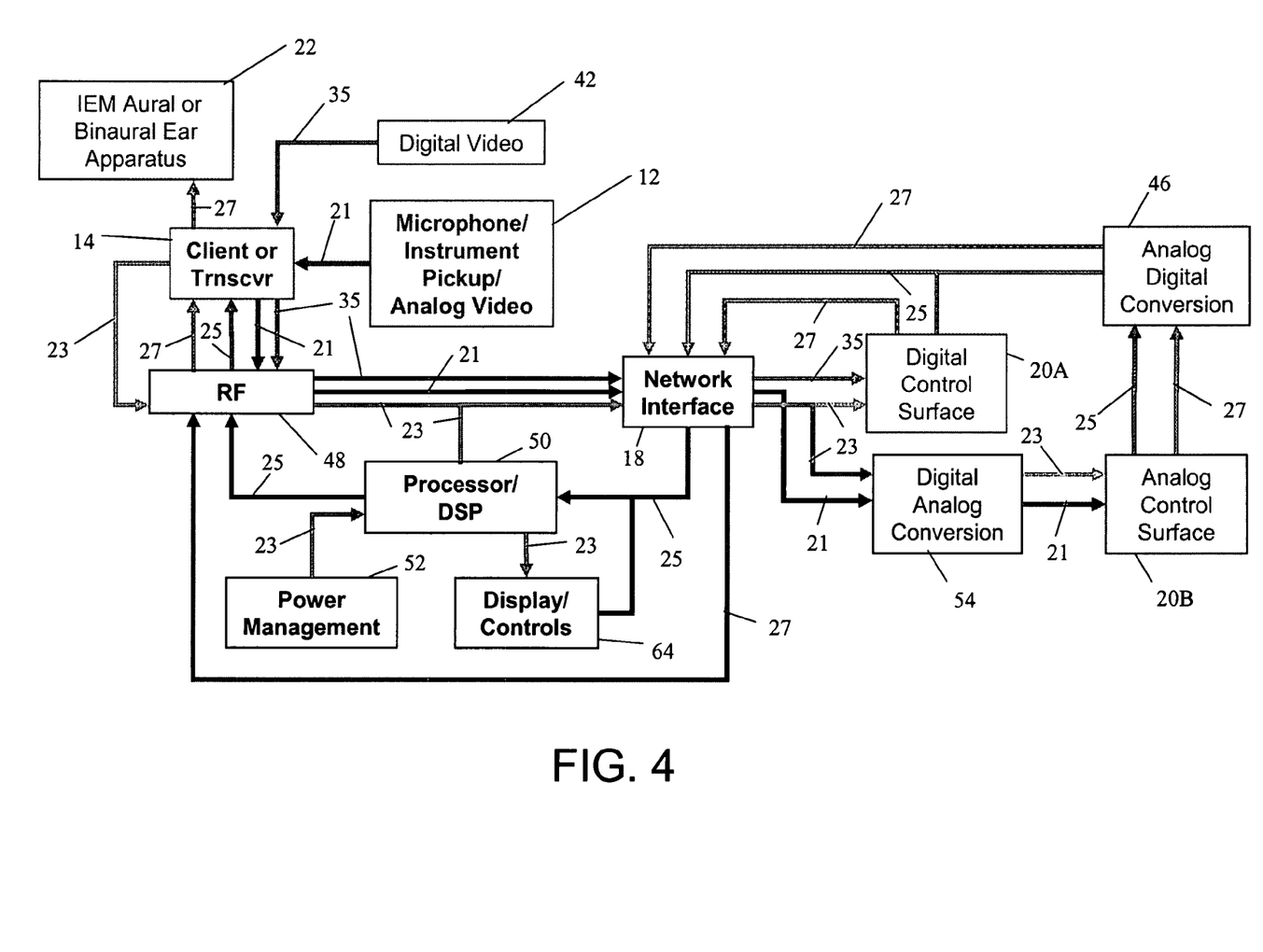
FIG. 4 shows a sample base station signal diagram for one embodiment of the present invention.

FIG. 4 shows an example access point or base station signal diagram for use in connection with the present invention. As shown in FIG. 4, client or transceiver 14 receives digital visual (e.g., video) data 35, multi-media input data 21 and system data 23 as described above, and transmits them wirelessly to RF component 68 for transmission to network interface 18. Network interface 18 transmits digital visual signal 35 to a digital control surface 20A, transmits AV input data 21 to an analog control surface 20B after DA converter 54 converts the digital signal to analog, and transmits system data to both control surfaces 20A and 20B. Network interface 18 then receives control data 25 and IEM audio data 27 from both control surfaces 20A and 20B, with data from analog control surface 20B being transmitted to interface 18 after being converted to digital by AD converter 46. As further shown in FIG. 4, network interface 18 then transmits control data 25 to each of processor 60, display 64 and RF component 68, and transmits IEM audio data 27 to RF component 48 for subsequent transmission to IEM apparatus 22. Processor 60 also transmits system data to each of display 64, power management 62 and network interface 18 components. In the embodiment of the invention where the IEM data is compressed, the uncompressed IEM data is transmitted to a data compression component (not shown) from the control surface via the network interface, at which point the data is compressed for transmission to the RF component 68 and subsequently to the client/transceiver 14, at which point it is uncompressed for transmission to the IEM apparatus 22.

It will be appreciated that global system parameters which can be monitored and/or controlled by the present invention can include but are not limited to, audio parameters, visual parameters, power management parameters, microphone or other audio input device parameters, IEM parameters, and radio parameters. Such global parameters can be monitored from the access point in stand-alone mode, and alternatively from a computer or control surface using system management software and/or hardware as described in connection with the present invention.

The audio and visual system parameters and the IEM system parameters can be monitored and adjusted remotely by a technician or engineer. Parameter settings are determined by the performer and/or the engineer and input into the system by the engineer. System management software can be provided in connection with the base station or control surface computer to allow the user to monitor and adjust the parameters through a graphical user interface, for example. The settings are stored in the access point and can be grouped and recalled in one step. Further, the present invention allows settings and groups to be sequenced. The present invention can also track and store the engineer's settings and preferences in real-time for later use. In one embodiment, this capability includes lighting and audio/visual equipment.

One embodiment of the present invention permits an acoustic or visual model of the current venue to be created and subsequently stored in a database. This acoustic or visual model can be accessed at any time to generate system settings or automate system management. In one embodiment, system settings are recommended for the current venue based on the acoustic or visual model, history of the engineer's settings for the current venue, past venues with similar acoustic or visual characteristics, and settings used for similar performances.

In a stand-alone mode, the multi-media components and IEM systems can be remotely managed from either the base station or remotely from a computer. Alternatively, the present invention can be managed from a digital control surface, such as a console or digital audio workstation (DAW). For purposes of the present invention, a DAW can be considered as any computer, computer system, processor or micro-controller based product that can convert analog multi-media signals to digital multi-media signals, record, and/or manipulate digital multi-media signals.

The transceiver is a lightweight device that can be attached to a performer or musical or visual instrument. The transceiver, in its body pack embodiment, can support a wide variety of sub-miniature to compact microphones and instrument pick-ups. The body pack transceiver can have multiple inputs supporting multiple audio/visual devices and one IEM ear apparatus, for example. In its handheld embodiment, the transceiver can support a wide range of handheld microphones and visual devices.

In an illustrative embodiment, client 14 is provided in the form of a transceiver, embodied as a body pack or handheld transceiver, which can provide phantom power for the operation of condenser microphones. The phantom power level can be adjusted or established using the base station, portable computer or control surface, for example, and depending upon the phantom power required by the operating device. In one embodiment, when setting up a particular microphone for use with the present invention, the system management programming associated with the present invention can inform the engineer of the phantom power requirement of the microphone. The engineer can then set the power level through the user interface. In one embodiment, a list of microphone types is stored by the system, along with recommended power settings for ease of reference for the engineer or other individual acting to establish the phantom power settings. The transceiver's input sensitivity or output level can be monitored and adjusted from the base station or portable computer (stand-alone mode) or control surface. The transceiver can be muted, has selectable groups and channels with automatic selection circuitry, automatic RF power selection, automatic gain selection allowing adjustment of input sensitivity, and power on/off switch and indicator. The transceiver also has limiter circuitry to prevent the IEM signal from damaging hearing and IEM pan control. In one embodiment, the transceiver uses an internal phased array antenna. In another embodiment, the transceiver uses an external antenna.

The transceiver can be powered by a primary battery, secondary battery, fuel cell, or secondary battery with fuel cell back-up, and can be provided with a weather resistant case allowing for outdoor use in inclement weather. In an example embodiment, the transceiver of the present invention comprises an audio subsystem, a visual subsystem, IEM subsystem, radio, and power supply. As shown in FIGS. 2 and 3, the transceiver performs analog-to-digital conversion, transmits the digital signal, transceiver system status, and IEM subsystem status to the access point, i.e., base station. The transceiver receives and processes control data from the base station and receives IEM signals from the base station. The transceiver also receives IEM subsystem status from the IEM device and receives and processes IEM subsystem control data from the base station. The transceiver similarly processes status and control data related to the audio, radio and visual subsystems.

In one embodiment, the base station, IEM subsystem, audio subsystem and visual subsystem are physically separate from one another, wherein the IEM subsystem, visual subsystem and audio subsystem communicate directly with the base station. In this embodiment, communication between the transceiver and IEM subsystem can occur wirelessly. In another embodiment, the audio and/or visual subsystems communicate directly with the base station, while the IEM subsystem communicates wirelessly with the base station via the microphone subsystem.

The base station can interact with multiple transceivers routing them to a control surface. Interfacing to a digital-to-analog converter and analog-to-digital converter allows the base station to interface with analog control surfaces. The base station provides a network interface such that it is compatible with a variety of transport protocols including Ethernet, ATM, and Firewire 2 using cable such as CAT 5 or better or fiber optic. A TRS connector can be located on the front panel to allow monitoring of incoming and outgoing signals when operating in the stand-alone mode. The base station can also incorporate a display such as an LCD display showing system status and base station, transmitter, visual, audio and IEM parameters such as RF and AF strength, channel, channel title, sample rate, sample format, transmitter location, and rear panel settings such as antenna attenuation, audio output level, power management data, and output switch settings, for example.

In stand alone mode, system parameters can be adjusted through the base station's front panel display and controls or through a computer using management software associated with the present invention. The system can interface with a control surface via a high speed connection such as USB2, Firewire2, Ethernet, or ATM connection allowing the control surface to manage all system parameters.

It will be appreciated that multiple base stations can be interconnected to maximize bandwidth, throughput, or number of channels, for example. Signals received by the base station from a transceiver can be routed to a digital console where the signals are routed to a storage device, sound reinforcement system, and/or blended to create an IEM mix, for example. The IEM mix is routed back to the base station and transmitted to the IEM ear apparatus via the transceiver.

In one embodiment, the IEM signals are routed from the base station to the transceiver then routed from the transceiver to the IEM ear apparatus wirelessly. In another embodiment, IEM signals are transmitted from the base station directly to the IEM ear apparatus wirelessly.

In one embodiment, the base station incorporates one or more phased array antennas, which allows the base station to track the location of active transceivers while extending range and increasing immunity to interference. In this embodiment, the phased array antenna operates with multiple antennas in a stack, picking up multiple signals from the active transceiver(s) and measuring the timing and transmission of the signals to determine and track the location. In one embodiment, the base station incorporates diversity circuitry allowing automatic antenna switching to provide improved QoS. In one embodiment, the base station and transceivers incorporate a GPS (global positioning system) to track the location of active transceivers. In yet another embodiment, the base station incorporates an antenna system that allows the base station to track the location of active transceivers through triangulation. Such a system can incorporate multiple antennas positioned at different locations which measure the timing of multi-directional signals communicated in connection with the various active transceivers to determine the specific location of the transceivers, including vertical and horizontal plane intersection information. In the present invention, the base station has automatic current and voltage sensing circuitry allowing the base station to operate at 100-250 Vac 50/60 Hz.

The IEM ear apparatus is capable of digitizing and transmitting microphone generated audio signals. The IEM subsystem can support condenser microphones not requiring a significant phantom power supply e.g., sub-miniature and miniature microphones. Like the transceiver, the IEM ear apparatus has the ability to transmit analog audio signals in multiple analog-to-digital sample rates and sampling formats. In one embodiment, the IEM signal decompression is hardware-based for faster processing hence lower latency. In another embodiment of the IEM earpiece, the decompression is software based. The system of the present invention further can employ coded modulation, such as XGCM, OFDM, COFDM, VOFDM, WOFDM, MIMO, BPSK, QPSK, CCK, and/or QAM, allowing more efficient use of bandwidth. Additionally, the present invention further supports DSSS (Direct Sequence Spread Spectrum) and FHSS (Frequency Hopping Spread Spectrum). The system management programming in connection with the present invention, as operated through the base station, standalone computer, or control surface, for example, can automatically and/or dynamically assign a modulation scheme, or an engineer can select a modulation scheme manually, such as through a graphical user interface or physical user interface such as on a control panel, for example. The present invention further allows transceivers to be discretely identified by assigning a unique identifier, modulation, and/or frequency. Any one of these identifiers can be manually selected by the engineer or automatically assigned by the system. The system can store these settings for future use.

The present invention provides higher sonic quality as well as multiple, user selectable sonic quality levels by allowing multiple sampling rates. A user of the present invention can, for example, select sample rates ranging from 48 k to 192 k sampling rates per second with all sampling rates having a 24 bit resolution supporting PCM and the DVD-A format. In another embodiment, multiple formats are supported allowing the user to select between PCM (used to create DVD-A) and DSD (used to create SACD) formats. Various visual formats (e.g., HDTV, SDTV, etc.) are also available and selectable using the present invention.

In one embodiment, the system of the present invention transmits over unlicensed bands having multi-band and multi-mode capability. The preferred embodiment transmits over the ISM and U-NII bands and supports wireless 802.11 standards and associated protocols. In another embodiment, the invention supports 802.16 standards and associated protocols. In another embodiment, the invention transmits in either or both the unlicensed 802.11a and 802.11g bands. The present invention further can provide an increased frequency response of 10-85 kHz versus a typical response of 30-18 kHz. In another embodiment, the present invention extends the frequency response from 10-100 kHz.

Through supporting bi-directional transmissions, the present invention allows for true remote systems management through the base station, a computer using management software associated with the present invention or a control surface such as a digital console or DAW. The present invention allows for the remote monitoring and adjustment of all system, base station, IEM subsystem, audio subsystem and visual subsystem functions eliminating the need to physically adjust transceiver parameters at the transceiver itself.

In the present invention, system management automatically synchronizes audio sample rates and sampling format with other transceivers to maintain compatibility. Any sampling rate and/or sampling format incompatibilities are identified at the base station or computer (stand-alone mode) or control surface and can be resolved automatically or manually.

The present invention preferably employs analog-digital converters which offer multiple sampling rates and sampling methods compatible with PCM (DVD-A) and DSD (SACD) standards while having low power consumption, making them ideal for portable applications, and ultra-high quality signal conversion. The present invention further can employ audio transmitters supporting the most current AES-3 standards for transmitting standardized digital microphone data and related system status and system control data transmission standards, thereby allowing efficient interaction with control surfaces. The present invention further can employ low powered radio components such as RoCs (Radio on Chip), that support multiple protocols, modulation schemes, and compatible processors resulting in more efficient spectral use, reduced power consumption, and higher immunity to interference.

In operation of the present invention, one or more performers can use the present invention in connection with a live performance. One or more base stations can be set up near a digital console. When using one base station, the base station connects directly to the control surface such as a digital console or DAW.

In a standalone mode, using one base station, the base station can interface with a computer containing system management software that is used to configure and manage system components and parameters. If a computer is not used, then configuration and management take place from the base station using the base station's display and front panel controls.

Multiple base stations can connect in one of three ways. The base stations can connect to a LAN such as Ethernet, ATM, Firewire2 or similar protocol so that, in stand-alone mode, a computer with system management software in accordance with the present invention can monitor and adjust system components and parameters or, when connected to a control surface, the control surface replaces the computer. Alternately, the base stations can form a master to multiple slave relation where the master forms the primary connection with the laptop or control surface. Finally, the base station, itself, can monitor and adjust system components and parameters through the base station's display and front panel controls.

The IEM ear apparatus is connected to the transceiver by the engineer. The engineer activates the base station and transceivers. If the engineer is using the system management software then the engineer activates the software. After the system has initialized, the engineer activates the transceiver(s).

As part of the initialization process, the system automatically performs diagnostics, optimizes the system, displays the system's status, and identifies potential points of failure with recommended courses of action such as battery replacement, for example. Optionally, the engineer can perform some or all of these activities manually. In one embodiment, the diagnostics, optimization, and failure identification functions are performed by software executing on a computer, base station or in connection with the DAW of the present invention. Programming associated with such software can collect and retrieve information, including historical and established settings which, through comparison and processing of software routines, can assist in diagnosing, optimizing, identifying failures, and recommending courses of action in connection with the initialization and execution of the system.

Once the initialization process is complete, the engineer distributes a transceiver to each performer. Instrumentalists or visual data collectors will fasten the body pack transceiver to their instrument or, alternatively, wear the body pack transceiver on their belt. The instrumentalist could also receive IEM earbuds/earpieces. The microphone and IEM earbuds/earpieces are connected to the body pack transceiver. If the instrumentalist also requires a second microphone, then a second body pack transceiver can be issued along with a headset microphone. Alternatively, a stereo body pack transceiver could be issued reducing the number of body pack transceivers required by one. Or, as a second alternative, a wireless headset that incorporates the IEM earbuds/earpieces and microphone can be used thus eliminating the need for a second body pack transceiver or a stereo body pack transceiver.

A vocalist or visual data collector has two options—use a handheld transceiver or use a body pack transceiver with the body pack transceiver providing an integrated IEM system and microphone as needed. It will be appreciated that a vocalist can be a speaker, singer or any person creating a sound using his or her body. The IEM system supports earbuds/earpieces or a headset consisting of earbuds/earpieces and microphone.

After issuing the transceivers, the engineer initiates an environmental scan. This environmental scan automatically scans a venue to evaluate the local RF environment ranking potential sources of interference; recommends interference free, intermodulation free settings; configures the RF components to maximize reception and immunity; provides dynamic channel selection and dynamic RF power regulation; and generates an acoustical model of the venue. The engineer uses this model to establish baseline settings. The engineer can also allow the system to automatically establish settings using the acoustical model, stored historical data related to the engineer's preferences and settings, acoustical models of similar venues, and settings from similar performances. Some of the parameters adjusted and monitored include: gain and attenuation, audio and RF signal strength, battery life, data throughput, sampling rate and sampling format, IEM limiter. Optionally, the engineer can perform some or all of these activities manually. The engineer has the ability to remotely activate and deactivate transceivers and earpieces by turning them on or off or muting them. Similarly, the engineer can scan a venue to establish baseline visual settings or parameters, such as settings related to lighting, formats, zoom level, camera height, view sequence, and camera arrangement, for example. The engineer can have the system model, recommend, store and adjust the visual settings or the engineer can perform these tasks manually.

The present invention tracks, sequences, and records the engineer's settings and preferences allowing this information to be stored as scenes and recalled at a later date. Scenes can be sequenced and stored for future use as super sets—groups.

If the body pack or IEM parameters for one or more artists/instrumentalists change throughout the performance, the engineer can record and store these parameters initiating them with one key stroke versus struggling to adjust multiple parameters for multiple transceivers "on the fly". Remote management can occur from the base station, computer, or control surface.

In one embodiment, the transceiver is provided with minimal controls—e.g., mute switch and power on/off switch with LED indicator, and IEM pan. In this embodiment, these controls exist solely as a back-up to the base station controls and can be "locked down" by the engineer eliminating the ability for the performer to overtly or accidentally alter the engineer's setting. This also eliminates the need for the engineer to come into contact with the performer.

In a separate embodiment, it will be appreciated that the base station can be integrated into a digital console or DAW to allow system management from the digital console or DAW.

In a separate embodiment, the IEM system exists as a stand-alone system with all the features and capability of the IEM subsystem that is integrated into the system of the present invention. The IEM system is capable of being operated remotely using a subset of the present invention's system management programming described above. In another embodiment, the IEM subsystem located in the transceiver is integrated into a headset containing a microphone and an ear apparatus. In this embodiment, direct communication with the base station is enabled, thereby eliminating dependence on the body pack transceiver, reducing body pack transceiver size and power requirements, reducing IEM latency, and allowing wireless communication.

In one embodiment, the present invention includes a digital multi-channel auto pan system (DMCAP) as a stand-alone system capable of tracking the location of DMCAP users. In an audio environment, this system has the additional capability of automatically adjusting the pan control of each channel of a control surface based on the movement of the DMCAP user within the soundfield. The DMCAP system uses a subset of the present invention's system management software described above. Multiple antennas or phased array antenna(s) are employed to allow the system to locate the position of each transceiver in this embodiment. This capability removes the subjectivity and automates the panning process for stereo and surround-sound recording and sound reinforcement.

In one embodiment, the present invention includes a digital wireless device interface (DWDI) which uses the bi-directional capability of the system of the present invention to wirelessly transmit digital control surface audio output signals to speakers and/or digital control surface visual output signals to a display, for example. In one embodiment, the DWDI exists as a stand-alone system and uses a subset of the system management software of the present invention.

In one embodiment, the present invention includes a digital wireless controller which uses the bi-directional capability of the system of the present invention to wirelessly monitor and adjust equipment remotely. One application of this embodiment is for the control of stage equipment—lighting, amplifiers, electronic musical instruments, and audio/visual equipment, for example. Other applications exist in the areas of manufacturing, build environment, security, and military, for example.

The transceiver of the present invention can also include a display, storage, and upgraded memory, processor, and operating system, thereby allowing it to access files from a network. The applications and files reside on the network reducing processor, memory, and power requirements. The transceiver also retains the bi-directional communication and locator functions.

In the binaural embodiment of the present invention, ultra miniature microphones and a DSP processor are incorporated into the ear apparatus provided with the present invention to create presence within the IEM mix providing a greater perception of realism by sampling the audio environment surrounding the ear apparatus user. In a further embodiment, it will be appreciated that the present invention can be used to create a mobile wireless LAN that would provide a wireless LAN for trains, buses, and other ground based transportation systems.

In one embodiment, a plurality of transceivers with microphone and IEM capability can be provided per base station in connection with the present invention. In another embodiment, a plurality of IEM transceivers can be provided per base station. In another embodiment, a plurality of microphone transceivers can be provided per base station. In a further embodiment, a plurality of base stations can be provided to increase the bandwidth. In a further embodiment, a plurality of base stations can be provided to increase the number of channels. In a further embodiment, a plurality of base stations can be provided to increase throughput.

In an even further embodiment, the IEM earpiece with integrated headset microphone can operate using standard wireless LAN protocols such as the 802.11 series and 802.16, thereby extending the application of the present invention beyond the audio industry for other uses which might employ a bi-directional communication system (e.g., wireless ultra thin client, digital "walkie-talkie", digital hands-free headset for office, call center, manufacturing, construction, military and search and rescue environments, and a hands-free VoIP telephone that interfaces with a business's intranet (WAN/LAN and VoIP system)).

In another embodiment, the access point or base station can act as a server for web based content and control backed up by an appropriate database and data routing algorithms. The local server function is to provide a web based command, control and system monitoring facility for the engineer. Additionally, the web server providing that facility provides an interface to the outside world. Webcast and interactive functions are thus available through this portal, allowing a myriad of applications heretofore unavailable in a single integrated media network product. For example, the present invention in this embodiment can provide webcasts to be broadcast over the Internet. Such webcasts may be applied in a variety of business situations. For example, performers can market their services to the recording industry by broadcasting events directly to the decision makers. Integration of the performances can be integrated with multimedia packaging overlays. Also, performers and venues can broadcast events for profit extending the reach of the performance to the living room or other venues. Further, venues can charge performers a nominal fee for use of the Internet infrastructure within the venue using as a carrier for the broadcast. Also, producers now have a means by which performances can be broadcast and scripted via Edit Decision Lists or ad hoc direction to the outside world thus providing a better packaged, more professional product.

In addition, audiences located anywhere where there is Internet access can provide feedback to performers and producers in real time even to the point of requesting specific material, thus improving the quality of the event experience for all concerned. Further, educators can be provided the opportunity to teach from the classroom or the field at will, interactively with students located anywhere the Internet goes.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the claims and their equivalents.

The invention claimed is:

1. A method for remote monitoring and adjustment of sound or visual parameters in a wireless media system having an audio subsystem and an in-ear monitoring (IEM) subsystem, comprising the steps of:
    providing an access point in two-way communication with said audio and IEM subsystems, said access point capable of receiving subsystem status data and digitized audio data from said audio subsystem, and further capable of receiving subsystem status data from said IEM subsystem, and further capable of transmitting IEM audio and control data to said IEM subsystem;
    providing a control surface in two-way communication with said access point, said control surface capable of receiving said audio data and subsystem data from said access point, identifying parameters of said audio data so as to allow said parameters to be monitored, receiving adjustment signals for said parameters from said control surface in the form of IEM control data, and transmitting said IEM control data to said access point for communication to said IEM subsystem; and
    providing a visual subsystem in two-way communication with said access point, said access point capable of receiving subsystem status data and digitized visual data from said visual subsystem, wherein said control surface is capable of receiving said visual data from said access point so as to allow said visual parameters to be monitored, and further is capable of receiving adjustment signals for said parameters in the form of visual subsystem control data for transmitting to said visual subsystem.

2. The method of claim 1 wherein said control surface is capable of displaying parameter information associated with said parameters such that a user of said control surface can visually monitor said parameters.

3. The method of claim 1 wherein said adjustment signals are received from a user of said control surface.

4. The method of claim 1 wherein said monitoring and adjustment of said parameters is performed automatically according to programming associated with said control surface.

5. The method of claim 1 including the steps of creating and storing an acoustic model of a performance venue based on said parameters.

6. The method of claim 1 wherein said control surface includes programming to provide a recommended set of parameters.

7. The method of claim 6 wherein said programming considers at least one of an acoustic model, venue setting history, engineer adjustment history and performance type setting history in providing said recommended set of parameters.

8. The method of claim 1 wherein said audio subsystem or said IEM subsystem includes a transceiver body pack.

9. The method of claim 1 wherein said audio subsystem or said IEM subsystem includes a hand-held transceiver.

10. The method of claim 1 wherein said access point is integrated into said control surface as via an interface card.

11. The method of claim 1 including the steps of remotely monitoring and adjusting global parameters, said global parameters including at least sound, IEM, radio and power supply parameters.

12. The method of claim 1 wherein said audio system further includes a radio subsystem, and a power supply subsystem, and wherein said base station is further capable of receiving subsystem status data from said radio and power supply subsystems and transmitting control data to said radio and power supply subsystems.

13. The method of claim 1 further including the step of creating and storing a visual model of a performance venue based on said visual parameters.

14. A media system for remotely monitoring and adjusting audio or visual parameters in a wireless media system having an audio subsystem and an in-ear monitoring (IEM) subsystem, comprising:
    an access point in two-way communication with said audio and IEM subsystems, said access point capable of receiving subsystem status data and digitized audio data from said audio subsystem, and further capable of receiving subsystem status data from said IEM subsystem, and further capable of transmitting IEM audio and control data to said IEM subsystem;
    a control surface in two-way communication with said access point, said control surface capable of receiving said audio data and subsystem data from said access point, identifying parameters associated with said audio data so as to allow said parameters to be monitored, receiving adjustment signals for said parameters from said control surface in the form of IEM control data, and transmitting said IEM control data to said access point for communication to said IEM subsystem; and
    a visual subsystem in two-way communication with said access point, said access point capable of receiving subsystem status data and digitized visual data from said visual subsystem, wherein said control surface is capable of receiving said visual data from said access point so as to allow said visual parameters to be monitored, and further is capable of receiving adjustment signals for said parameters in the form of visual subsystem control data for transmitting to said visual subsystem.

15. The system of claim 14 wherein said control surface is capable of displaying parameter information associated with said parameters such that a user of said control surface can visually monitor said parameters.

16. The system of claim 14 wherein said adjustment signals are received from a user of said control surface.

17. The system of claim 14 wherein said audio subsystem or said IBM subsystem includes a transceiver body pack.

18. The system of claim 14 wherein said audio subsystem or said IBM subsystem includes a hand-held transceiver.

19. The system of claim 14 wherein said access point is integrated into said control surface via an interface card.

20. The system of claim 14 including means for remotely monitoring and adjusting global parameters, said global parameters including at least sound, IBM, microphone, radio and power supply parameters.

21. The system of claim 14 wherein said audio system further includes a radio subsystem, and a power supply subsystem, and wherein said access point is further capable of receiving subsystem status data from said radio and power supply subsystems and transmitting control data to said radio and power supply subsystems.

22. The system of claim 14 including means for dynamically assigning a modulation scheme for said microphone subsystem.

23. The method of claim 14 including the step of creating and storing a visual model of a performance venue based on said visual parameters.

24. A method for remote monitoring and adjustment of visual or sound parameters in a wireless audio system having a microphone subsystem, an in-ear monitoring (IEM) subsystem and a radio subsystem, comprising the steps of:
   providing an access point in two-way communication with said microphone and IBM subsystems, said base station capable of receiving subsystem status data and digitized audio data from said microphone subsystem, and further capable of receiving subsystem status data from said IEM subsystem and said radio subsystem, and further capable of transmitting IEM audio and control data to said IEM subsystem, and transmitting control data to said radio subsystem;
   providing system control programming in two-way communication with said access point, said control programming comprising programming capable of receiving said audio data and subsystem data from said access point, identifying parameters of said audio data so as to allow said parameters to be monitored, receiving adjustment signals for said parameters in the form of IEM control data and radio control data, and transmitting said IEM control data and radio control data to said access point for respective communication to said IBM subsystem and said radio subsystem; and
   providing a visual subsystem in two-way communication with said access point, said access point capable of receiving subsystem status data and digitized visual data from said visual subsystem, and wherein said control programming includes programming capable of receiving said visual data from said access point so as to allow said visual parameters to be monitored, and further is capable of receiving adjustment signals for said parameters in the form of visual subsystem control data for transmitting to said visual subsystem.

25. An article of manufacture comprising a computer instruction carrier, readable by a computer, tangibly embodying one or more instructions executable by the computer to perform a method of remotely monitoring and adjusting visual or sound parameters in a wireless media system having an audio subsystem, a visual subsystem and an in-ear monitoring (IBM) subsystem, the method comprising the steps of:
   establishing two-way communication with said audio, visual and IEM subsystems so as to be capable of receiving subsystem status data and digitized audio data from said audio subsystem, and further capable of receiving subsystem status data from said IBM subsystem, and further capable of transmitting IEM audio and control data to said IBM subsystem, and further capable of receiving subsystem status data and digitized visual data from said visual subsystem;
   programming for identifying parameters of said audio data so as to allow said parameters to be monitored, receiving adjustment signals for said audio parameters from said control surface in the form of IBM control data, and transmitting said IBM control data to said base station for communication to said IBM subsystem; and
   programming for identifying parameters of said visual data so as to allow said visual parameters to be monitored, and for receiving adjustment signals for said parameters in the form of visual subsystem control data for transmitting to said visual subsystem.

26. The article of claim 25 wherein said adjustment signals are received from a user of a user interface associated with said programming.

27. The article of claim 25 wherein said adjustment signals are received according to further programming associated with said memory.

28. A wireless controller for use with a wireless media system having an audio subsystem, a visual subsystem and an in-ear monitoring (IEM) subsystem comprising:
   sound system control programming for monitoring and receiving adjustment signals for sound parameters associated with signals received from said audio subsystem; and said IEM subsystem;
   visual system control programming for monitoring and receiving adjustment signals for visual parameters associated with signals received from said visual subsystem; and
   external system control progamming for monitoring and receiving adjustment signals for at least one of lighting and visual equipment.

* * * * *